(12) United States Patent
Ishikawa et al.

(10) Patent No.: US 10,544,841 B2
(45) Date of Patent: Jan. 28, 2020

(54) MULTIPLATE WET CLUTCH

(71) Applicant: NSK-WARNER K.K., Shinagawa-ku, Tokyo (JP)

(72) Inventors: Taichiro Ishikawa, Fukuroi (JP); Tomoyuki Kirino, Fukuroi (JP)

(73) Assignee: NSK-WARNER K.K., Tokyo (JP)

( * ) Notice: Subject to any disclaimer, the term of this patent is extended or adjusted under 35 U.S.C. 154(b) by 80 days.

(21) Appl. No.: 15/919,274

(22) Filed: Mar. 13, 2018

(65) Prior Publication Data

US 2018/0266499 A1    Sep. 20, 2018

(30) Foreign Application Priority Data

Mar. 14, 2017  (JP) ................................ 2017-048609

(51) Int. Cl.
| F16D 25/12 | (2006.01) |
| F16D 48/02 | (2006.01) |
| F16H 57/04 | (2010.01) |
| F16D 25/0638 | (2006.01) |

(52) U.S. Cl.
CPC ......... F16D 25/14 (2013.01); F16D 25/0638 (2013.01); F16H 57/0472 (2013.01); F16D 2300/12 (2013.01)

(58) Field of Classification Search
None
See application file for complete search history.

(56) References Cited

U.S. PATENT DOCUMENTS

| 5,106,348 A | * | 4/1992 | Koivunen | ............... | F16D 25/02 |
| | | | | | 192/48.614 |
| 5,281,190 A | * | 1/1994 | Koivunen | ........... | F16D 25/0638 |
| | | | | | 192/101 |
| 2004/0168878 A1 | | 9/2004 | Yabe et al. | | |
| 2006/0169566 A1 | * | 8/2006 | Egawa | ................ | F16D 25/0638 |
| | | | | | 192/85.34 |
| 2017/0138413 A1 | * | 5/2017 | Ito | ........................... | F16D 25/12 |

FOREIGN PATENT DOCUMENTS

JP    2004-239404 A    8/2004

* cited by examiner

*Primary Examiner* — Timothy Hannon
(74) *Attorney, Agent, or Firm* — Shapiro, Gabor and Rosenberger, PLLC

(57) ABSTRACT

Provided is a multiplate wet clutch having capability of preventing damage of an axial groove portion formed in an inner cylindrical portion of a shaft.
An inner cylindrical portion 3 of the shaft is formed with an axial groove 75 which is opened to a circumferential groove 53 and with which other members of the multiplate wet clutch for regulating movement of a retaining ring 55 toward axially on the other side are to be engaged. A pressure plate 35 is formed, on a surface 36b axially on the other side thereof, with a recessed portion 77 axially opposed to an opening portion 81 of the axial groove 75 through the retaining ring 55.

8 Claims, 5 Drawing Sheets

MULTIPLATE WET CLUTCH

The disclosure of the following priority application is herein incorporated by reference:
Japanese Patent Application No. 2017-048609.

Technical Field

The present invention relates to a multiplate wet clutch to be assembled into an automatic transmission of an automobile and the like.

Background Art

An automatic transmission in a vehicle such as an automobile is equipped with a multiplate wet clutch used in a clutch, a brake or the like. The multiplate wet clutch has a configuration in which a plurality of friction plates each formed by adhering a wet friction material on a surface of a core plate that is a metal substrate, and a plurality of separator plates each as a friction counterpart material formed of a single plate such as a metal plate are alternately arranged, and the friction plates and the separator plates are pressed to each other through an axially moving piston and are engaged with each other or the engaging is released to transmit or disconnect driving force between a clutch housing and a shaft transmitting the driving force from an engine.

The multiplate wet clutch is equipped with a hydraulic chamber to which a hydraulic fluid for axially moving the piston is supplied. As a wall member that defines the hydraulic chamber, an art of using the pressure plate that axially faces the piston and is fixed to an outer peripheral surface of an inner cylindrical portion of the shaft is disclosed. In the multiplate wet clutch equipped with the hydraulic chamber having a configuration according to which the hydraulic chamber is defined by using the pressure plate, the pressure plate is generally fitted onto a circumferential groove arranged in the inner cylindrical portion of the shaft together with a retaining ring for preventing disengagement of the pressure plate and fixed to the shaft.

If the hydraulic fluid is supplied to the hydraulic chamber, the piston moves in a direction in which the multiplate wet clutch is engaged, namely, is fastened to apply a compressing load to the friction plate and the separator plate through hydraulic pressure of the hydraulic fluid. The hydraulic fluid moves the piston in the direction in which the multiplate wet clutch is engaged, and simultaneously presses the pressure plate in a direction axially opposite to the moving direction of the piston. Thus, the pressure plate presses the retaining ring. The pressure plate is compressed onto the retaining ring. Thus, rotation of the pressure plate relative to the shaft is prevented, and simultaneously the retaining ring is axially restrained in the circumferential groove. According to such a configuration, falling-off of the retaining ring from the circumferential groove is prevented.

However, in operation of the piston in a direction for releasing the multiplate wet clutch, the hydraulic fluid is discharged from the hydraulic chamber, and therefore the hydraulic pressure applied to the pressure plate becomes negative. More specifically, force in a direction opposite to the direction when the multiplate wet clutch is engaged is applied to the pressure plate, and the pressure plate is pulled in a direction of separating from the retaining ring. Then, pressing force of the pressure plate to the retaining ring is reduced, restraining force of the retaining ring to the circumferential groove by the pressure plate is reduced, and the retaining ring is liable to rotate or fall off from the shaft. If the retaining ring rotates, the retaining ring and the circumferential groove are worn, so the retaining ring is wobbled and easily disengaged from the circumferential groove. If the retaining ring is disengaged from the circumferential groove, the pressure plate is disengaged from the inner cylindrical portion of the shaft, the piston does not function, and operation of engaging and releasing of the multiplate wet clutch is unable to be performed.

With regard to the retaining ring for fixing a canceller, a Patent Literature that is Japanese Patent Application Laid-Open Publication No. 2004-239404 discloses a multiplate wet clutch equipped with structure of regulating axial movement of the canceller and structure of suppressing diameter enlargement of the retaining ring as a measure for preventing falling-off of the retaining ring from a circumferential groove formed in an inner cylindrical portion of a clutch housing.

Moreover, as another art of preventing rotation of a pressure plate and to axially restraining a retaining ring, there is known an art in which an axial groove opened to a circumferential groove to which the retaining ring is fixed is provided on an outer peripheral surface of an inner cylindrical portion of a shaft to which the pressure plate and the retaining ring are fixed, and in a state in which other constituent members and the like of a multiplate wet clutch are brought into contact with the retaining ring, the other constituent members are engaged with the axial groove to prevent axial movement of the retaining ring. FIG. 4 is an axial cross-sectional view obtained by radially viewing a substantial portion of a conventional multiplate wet clutch 101 having such structure. In addition, for convenience of explanation, in FIG. 4, a left hand toward a paper surface is taken as axially one side and a right hand is taken as axially the other side.

The multiplate wet clutch 101 is equipped with a hub 105 integrally assembled with an inner cylindrical portion 103 on an outer peripheral side of the inner cylindrical portion 103 of the shaft transmitting driving force from an engine, and a clutch housing 114 on a position coaxial with the hub 105 and arranged to be relatively rotatable with the hub 105. A plurality of friction plates 115 are fitted to a spline 116 on an inner periphery side of the clutch housing 114, and a plurality of separator plates 113 are fitted to a spline 111 on an outer peripheral side of the hub 105. A piston 121 and a pressure plate 135 are provided on an outer peripheral side of the inner cylindrical portion 103 of the shaft. The pressure plate 135 is fitted to the inner cylindrical portion 103 axially on the other side of a sliding portion thereof at which the piston 121 slides on the inner cylindrical portion 103. A hydraulic chamber 157 is defined by the piston 121, the pressure plate 135 and an outer peripheral surface of the inner cylindrical portion 103 between the piston 121 and the pressure plate 135.

A circumferential groove 153 is formed on the outer peripheral surface of the inner cylindrical portion 103 adjacent to axially the other side of the pressure plate 135, and a retaining ring 155 is locked to the circumferential groove 153. Movement of the pressure plate 135 in the direction to axially on the other side is regulated by the retaining ring 155. Moreover, a canceller chamber 161 for canceling centrifugal hydraulic pressure of the hydraulic chamber 157 is defined by the piston 121, the hub 105, and the outer peripheral surface of the inner cylindrical portion 103 adjacently to axially one side of the piston 121. In the canceller chamber 161, a canceller 165 also serving as a retainer of a return spring 163 biasing the piston 121 in a direction in which the multiplate wet clutch 101 is released is disposed.

FIG. 5A is an enlarged view of a part surrounded by a circle B in FIG. 4, and FIG. 5B is a plan view of the part.

An axial groove 175 having a predetermined width is formed on the outer peripheral surface of the inner cylindrical portion 103 of the shaft, and an end portion axially on one side of the axial groove 175, namely, the end portion on a side of the hydraulic chamber 157 is opened to the circumferential groove 153 to which the retaining ring 155 is locked. Other members (not shown in a figure) constituting the multiplate wet clutch 101 are engaged with the axial groove 175 in a state in contact with the retaining ring 155, thereby axially restricting the retaining ring 155 to prevent disengagement from the inner cylindrical portion 103.

CITATION LIST

Patent Literature : JP 2004-239404 A

SUMMARY OF INVENTION

Technical Problem

According to the structure of Patent Literature Japanese Patent Application Laid-Open Publication No. 2004-239404, falling-off of a retaining ring from an inner cylindrical portion of a shaft can be prevented. However, a locking portion of the retaining ring formed on a pressure plate as in Japanese Patent Application Laid-Open Publication No. 2004-239404 is processed so as to correspond to an outer diameter of the retaining ring, and therefore precise processing is required, and the number of machining or assembling steps is liable to increase.

Moreover, according to the structure as shown in each view of FIG. 4 and FIG. 5, if a pressure plate 135 is pressurized during engaging and releasing of a multiplate wet clutch 101, and a retaining ring 155 is pressed by the pressure plate 135 to a groove surface of a circumferential groove 153 axially on the other side, stress is concentrated on a part surrounded with dashed lines D2 and D3 in FIG. 5A and FIG. 5B, namely, the part of the D3 being a contact part between an axial groove 175 and the retaining ring 155, and a groove edge portion of the axial groove 175 is liable to be damaged. If the axial groove 175 is damaged, the retaining ring 155 is liable to rotate or fall off from the inner cylindrical portion 103 of the shaft. If the retaining ring 155 rotates, as mentioned above, the retaining ring 155 and the circumferential groove 153 are worn, and the retaining ring 155 is wobbled and easily disengaged from the circumferential groove 153. Further, if the retaining ring 155 is disengaged from the circumferential groove 153, the pressure plate 135 is disengaged from the inner cylindrical portion 103, and the piston 121 does not function, and as a result, operation of engaging and releasing of the multiplate wet clutch 101 is unable to be performed.

As a countermeasure against such damage of the axial groove, a modification of shape of the axial groove 175 or reinforcement of the axial groove 175 by heat treatment can be considered. However, in modifying the shape of the axial groove 175, a space for forming the axial groove after the modification is liable to be expanded, and an increase of after-treatment steps including straightening of deformation is concerned.

The present invention has been made in view of such circumstances, and is contemplated for providing a multiplate wet clutch having capability of preventing damage of an axial groove portion formed in an inner cylindrical portion of a shaft without expansion of a size of the clutch and without an increase of machining or assembling steps.

Solution to Problem

In order to solve the above-described problems, a multiplate wet clutch of the present invention has features in which the multiplate wet clutch is equipped with: a plurality of friction plates provided axially in one of an inner cylindrical member and an outer cylindrical member; a plurality of separator plates that are provided in the other of the inner cylindrical member and the outer cylindrical member, and are axially alternately arranged with the plurality of the friction plates; a piston that is movably provided axially on the inner cylindrical member, and if the piston moves in a direction to axially on one side, allows the plurality of the friction plates to engage with the plurality of the separator plates, and if the piston moves in a direction to axially on the other side, releases the engaging; a wall member provided on the inner cylindrical member to define a hydraulic chamber generating hydraulic pressure for moving the piston; a retaining ring that is locked in a circumferential groove formed in the inner cylindrical member and is in contact with a part axially on the other side of the wall member to regulate movement of the wall member in the direction to axially on the other side; and the inner cylindrical member being formed with an axial groove which is opened to the circumferential groove, in which, the wall member is formed, in a part axially on the other side thereof, with a recessed portion axially opposed to the axial groove through the retaining ring.

Moreover, a preferred aspect of the present invention has a feature in which the wall member is an annular member, and a circumferential width of the recessed portion is larger than a width of the axial groove.

Moreover, a preferred aspect of the present invention has a feature in which the wall member is an annular member, and the recessed portion has a radially extending groove shape.

Moreover, a preferred aspect of the present invention has a feature in which a plurality of the recessed portions are formed.

The present invention can provide a multiplate wet clutch that can prevent damage of an axial groove portion formed in an inner cylindrical portion of a shaft without expansion of a size of the clutch and without an increase of machining or processing steps.

DESCRIPTION OF EMBODIMENTS

Hereinafter, a configuration of a multiplate wet clutch according to an embodiment of the present invention will be described.

Figure 1:
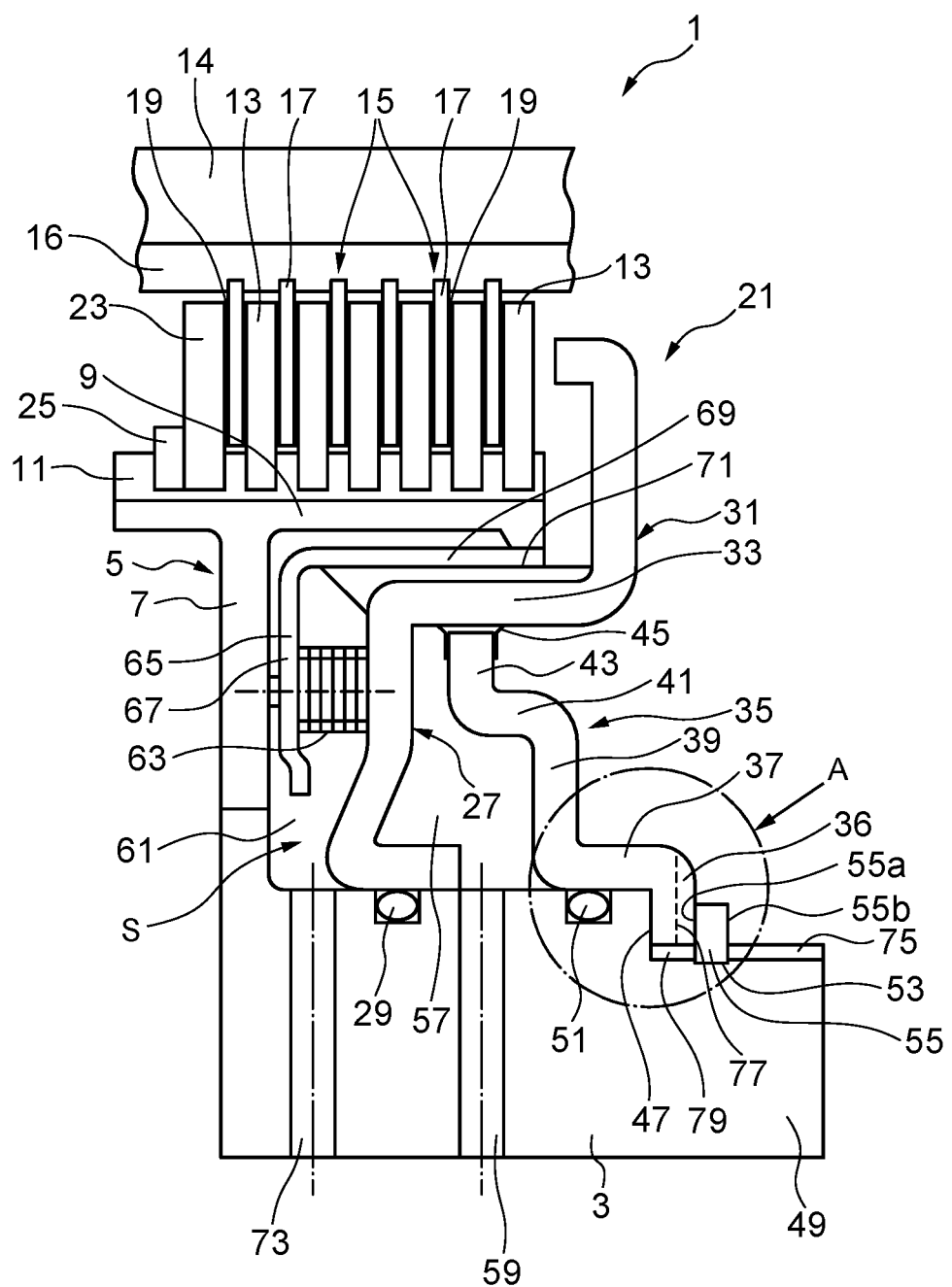
FIG. 1 is an axial cross-sectional view showing a state in which a substantial portion of a multiplate wet clutch according to an embodiment of the present invention.

FIG. 1 is an axial cross-sectional view showing a state in which a substantial portion of a multiplate wet clutch according to the embodiment of the present invention.

Figure 2A:
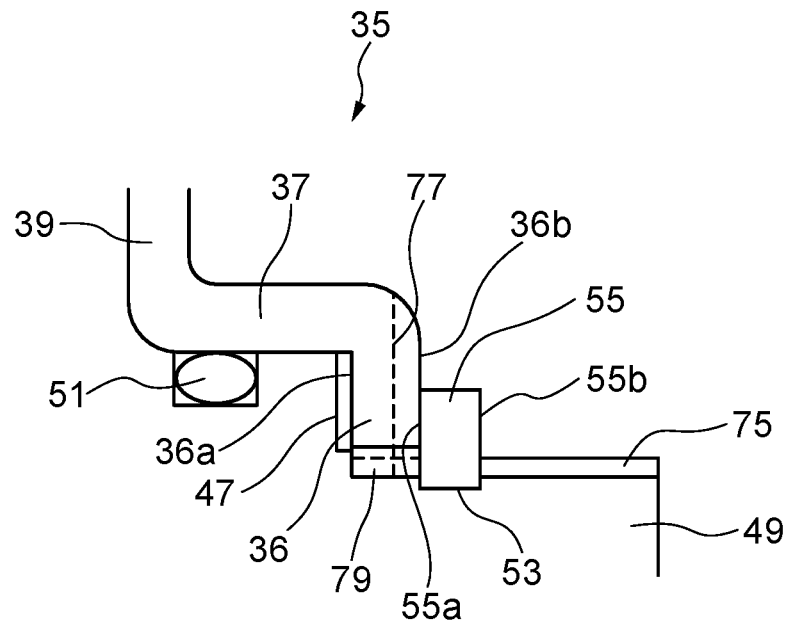
FIG. 2A is an enlarged view of a part surrounded by a circle A in FIG. 1.
Figure 2B:
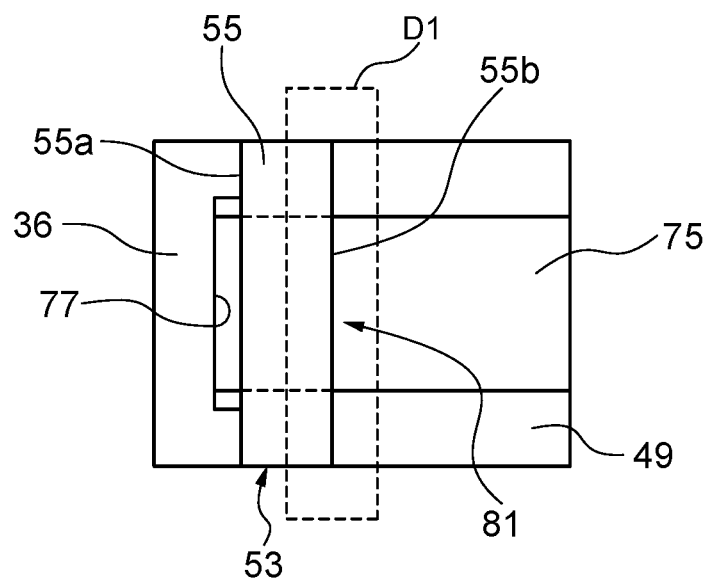
FIG. 2B is a plan view of the part.

FIG. 2A is an enlarged view of a part surrounded by a circle A in FIG. 1, and FIG. 2B is a plan view of the part.

In addition, in the present description, an axial direction is taken as an axial direction of the multiplate wet clutch, and a direction perpendicular to the axial direction is taken as a radial or diameter direction. Moreover, for convenience of explanation, a left hand toward a paper surface in FIG. 1 is taken as axially on one side, and a right hand is taken as axially on the other side.

A multiplate wet clutch 1 according to the present embodiment is equipped with a hub 5 integrally assembled with an outer peripheral surface of an inner cylindrical portion 3 of a shaft to which a driving force from an engine (not shown) is transmitted. The hub 5 is equipped with an annular wall portion 7 extending in an outer diameter direction from the outer peripheral surface of the inner cylindrical portion 3, and a cylindrical portion 9 extending from an edge portion on an outer diameter side of the annular wall portion 7 to axially the other side. A circumferential space S is formed by the outer peripheral surface of the inner cylindrical portion 3 and an inner peripheral surface of the cylindrical portion 9 of the hub 5. In the circumferential space S, a part axially on one side is closed by the annular wall portion 7 of the hub 5, and a part axially on the other side is opened.

A spline 11 is provided on the outer peripheral surface of the cylindrical portion 9 of the hub 5. A plurality of annular separator plates 13 arranged to be axially movable are fitted on the spline 11. The separator plate 13 is formed of one plate of metal. The plurality of separator plates 13 are arranged from the vicinity of an edge portion axially on one side of the cylindrical portion 9 to the vicinity of an edge portion axially on the other side.

A cylindrical clutch housing 14 that is coaxial with the hub 5 and rotates relatively to the hub 5 is arranged on an outer diameter side of the cylindrical portion 9 of the hub 5 through a predetermined space. The clutch housing has a conventionally known configuration, and therefore more detailed explanation is omitted. A spline 16 is provided on an inner peripheral surface of the clutch housing 14, and a plurality of annular friction plates 15 arranged to be axially movable are fitted on the spline 16. The friction plate 15 is formed by adhering a wet friction material 19 on a surface of an annular core plate 17 that is a metal substrate. In addition, the wet friction materials 19 are adhered on both surfaces of the core plate 17, but the wet friction material 19 adhered on only one surface is also available. These friction plates 15 are arranged between the separator plates 13 axially adjacent to each other, respectively. More specifically, the friction plate 15 and the separator plate 13 are axially alternately arranged to configure a multiplate clutch portion.

The multiplate wet clutch 1 is further equipped with a piston 21 for pressing and fastening the multiplate clutch portion that is composed of the separator plates 13 and the friction plates 15, an end plate 23 that is arranged in a part on the outer peripheral side of the cylindrical portion 9 of the hub 5 and for holding the separator plates 13 and the friction plates 15 in a fixed state at one end axially on one side of the cylindrical portion 9, and a retaining ring 25 for holding the end plate 23 in the part on the outer peripheral side of the cylindrical portion 9.

The piston 21 is an annular member, and a cross-section thereof along the axial direction from the edge portion on the inner diameter side to the edge portion on the outer diameter side is formed into a shape in which two U-shaped portions 27 and 31 are radially alternately continued, or a substantially Z shape. The U-shaped portion 27 on the inner diameter side of the piston 21 is arranged in the circumferential space S by directing a convex side of the U shaped portion 27 toward axially on one side. A part on the inner diameter side of U-shaped portion 27, namely, an edge portion on the inner diameter side of the piston 21 is slidably engaged with the outer peripheral surface of the inner cylindrical portion 3 of the shaft axially on the other side of the annular wall portion 7 of the hub 5. A seal member 29 is disposed between the edge portion on the inner diameter side of the piston 21 and the outer peripheral surface of the inner cylindrical portion 3 of the shaft. A part on the outer diameter side of the U-shaped portion 27 is arranged in the vicinity of the inner peripheral surface of the cylindrical portion 9 of the hub 5 through a predetermined gap and extends substantially in parallel to the inner peripheral surface of the cylindrical portion 9.

On the other hand, the U-shaped portion 31 on the outer diameter side of the piston 21 is arranged in such a manner that the convex side of the U shaped portion 31 is directed toward axially the other side, and the concave side of the U shaped portion 31 is axially faced with an end portion axially on the other side of the cylindrical portion 9 of the hub 5. The part on the inner diameter side of the U-shaped portion 31 is continuous with the part on the outer diameter side of the U-shaped portion 27. A continuous portion between the part on the inner diameter side of the U-shaped portion 31 and the part on the outer diameter side of the U-shaped portion 27 forms a cylindrical portion 33, and the cylindrical portion 33 extends in parallel to the cylindrical portion 9 through a predetermined gap. An end portion on the outer diameter side of the U-shaped portion 31, namely, an end portion on the outer diameter side of the piston 21 axially faces the separator plate 13 arranged most axially on the other side, that is, on the most right side in FIG. 1.

On the outer peripheral surface of the inner cylindrical portion 3 of the shaft, a pressure plate 35 is fitted to a part axially on the other side of a sliding portion at which the edge portion on the inner diameter side of the piston 21 slides on the outer peripheral surface of the inner cylindrical portion 3.

Figure 3:
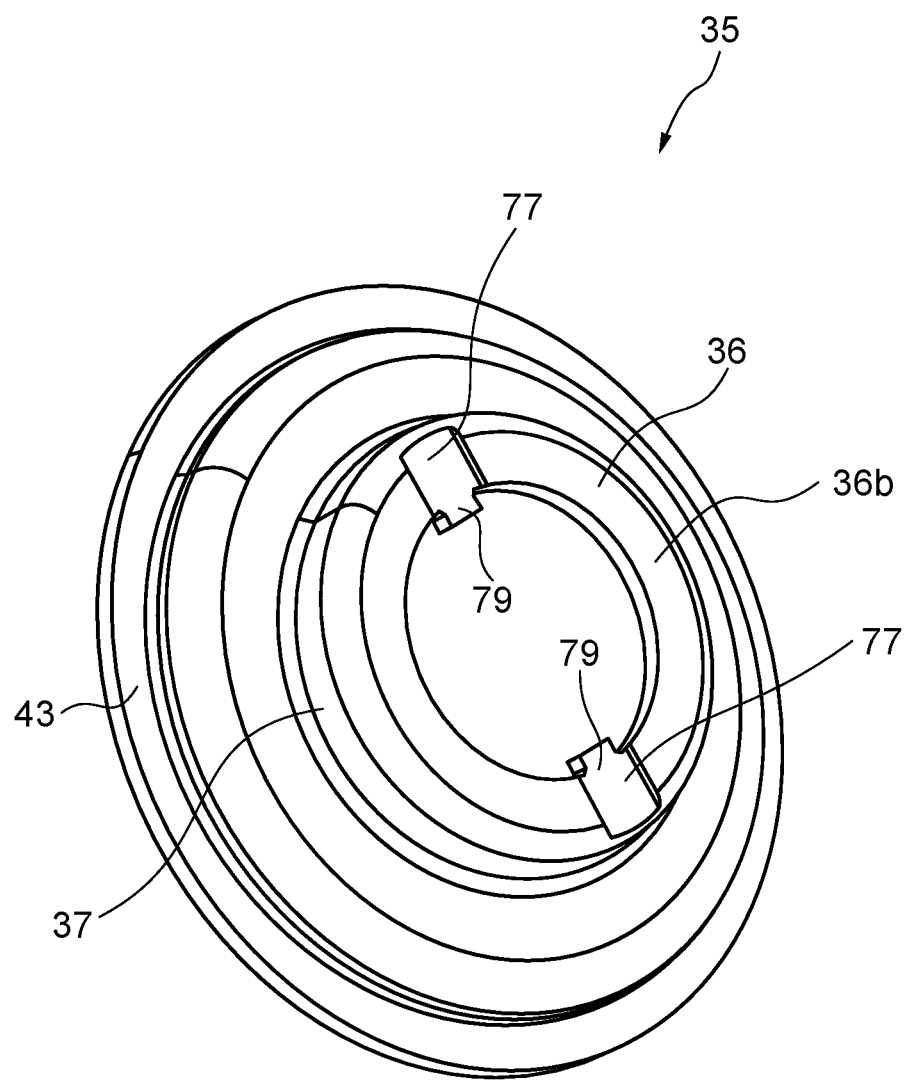
FIG. 3 is an enlarged perspective view of a pressure plate.
Figure 4:
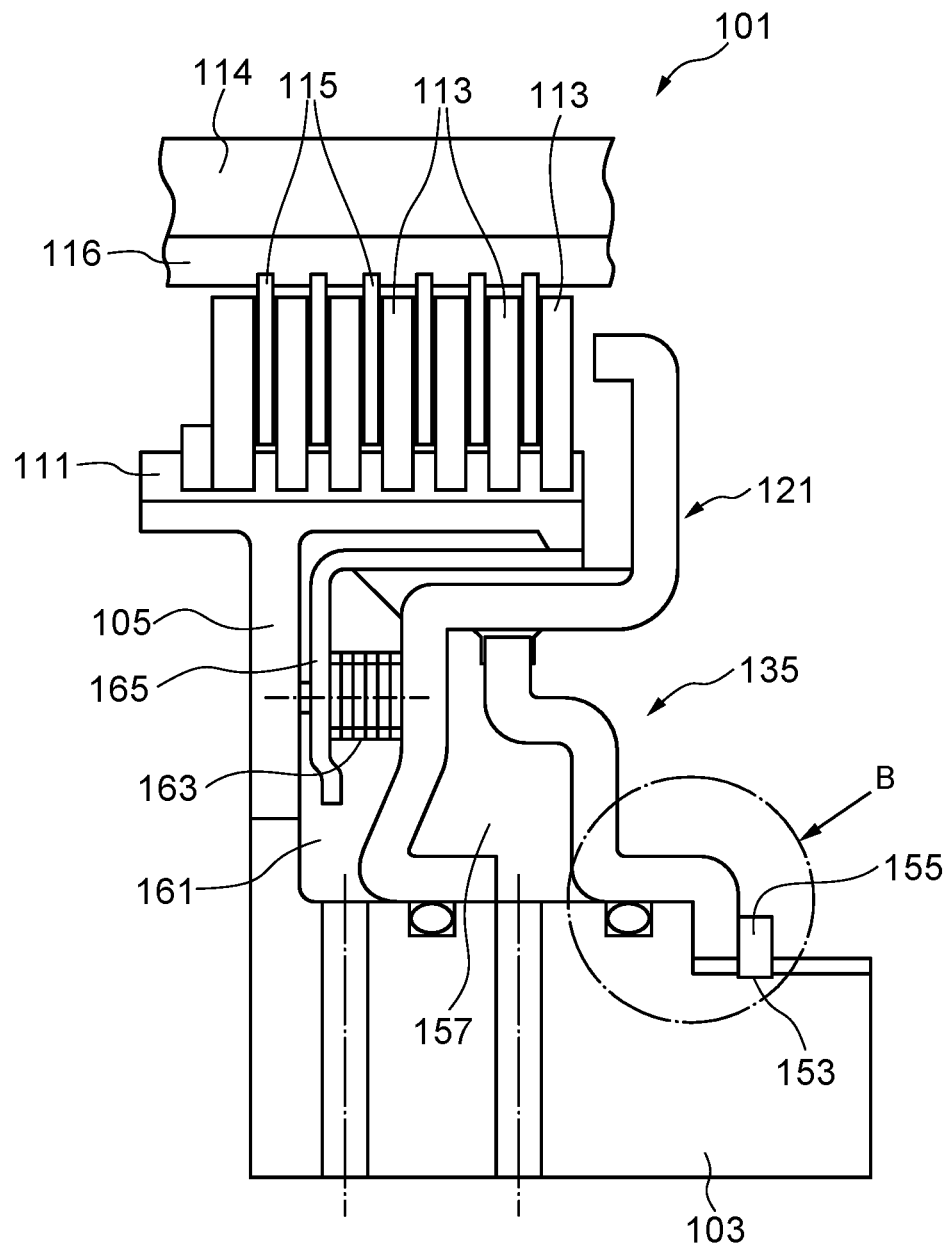
FIG. 4 is an axial cross-sectional view showing a state in which a substantial portion of a multiplate wet clutch according to a conventional example.

FIG. 3 shows an enlarged perspective view of the pressure plate 35. As shown in FIG. 3, the pressure plate 35 is an annular member. As shown in FIG. 1, the cross-sectional shape from an edge portion on the inner diameter side of the pressure plate 35 to an edge portion on the outer diameter side of the same plate 35 is formed into a stepwise shape in which a plurality of axially extending portions and a plurality of radially extending portions are alternately and smoothly continued. In the present embodiment, the pressure plate 35 is formed of a first radially extending portion 36 having an edge portion on the inner diameter side of the pressure plate 35, a first axially extending portion 37 extending axially on one side from an edge portion on an outer diameter side of the first radially extending portion 36, a second radially extending portion 39 extending in the outer diameter direction from axially one side end portion of the first axially extending portion 37, a second axially extending portion 41 extending from an edge portion on the outer diameter side of the second radially extending portion 39 toward axially on one side, a third radially extending portion 43 extending in the outer diameter direction from an end portion axially on one side of the second axially extending portion 41. An edge portion on the outer diameter side of the third radially extending portion 43 is an edge portion on the outer diameter side of the pressure plate 35.

A seal member 45 is disposed in the edge portion on the outer diameter side of the third radially extending portion 43, namely, the edge portion on the outer diameter side of the pressure plate 35, and is engaged with the inner peripheral surface of the cylindrical portion 33 of the piston 21. More specifically, the inner peripheral surface of the cylindrical portion 33 of the piston 21 is engaged with the edge portion on the outer peripheral side of the pressure plate 35 slidably in the axial direction.

The inner cylindrical portion 3 of the shaft is formed, at a part axially on the other side of the sliding portion at which the edge portion on the inner diameter side of the piston 21 slides on the inner cylindrical portion 3, through a step portion 47, with a small diameter portion 49 having a diameter smaller than a diameter of the outer peripheral surface of the sliding portion. In addition, a part of the inner cylindrical portion 3 axially on one side relative to the small diameter portion 49 is referred to as a large diameter portion. An edge portion on the inner diameter side of the first radially extending portion 36 of the pressure plate 35, namely, the edge portion on the inner diameter side of the pressure plate 35 is engaged with the outer peripheral surface of the small diameter portion 49. Further, a surface 36a axially on one side of the first radially extending portion 36 is engaged with the step portion 47 of the inner cylindrical portion 3. Moreover, the first axially extending portion 37 of the pressure plate 35 is fitted onto the outer peripheral surface of the edge portion axially on the other side end portion of the large diameter portion of the inner cylindrical portion 3. A seal member 51 is disposed between the inner peripheral surface of the first axially extending portion 37 and the outer peripheral surface of the large diameter portion of the inner cylindrical portion 3.

A circumferential groove 53 is formed in the small diameter portion 49 of the inner cylindrical portion 3 of the shaft. The circumferential groove 53 is formed adjacent to axially the other side of an engaging portion of the first radially extending portion 36 with the small diameter portion 49. A retaining ring 55 is engaged with the circumferential groove 53. A surface 36b axially on the other side of the first radially extending portion 36 is in contact with a surface 55a axially on one side of the retaining ring 55. The first radially extending portion 36 is arranged between the step portion 47 and the retaining ring 55 and in contact therewith, and the first radially extending portion 36 is fixed to the inner cylindrical portion 3 in a state in which axial movement of the first radially extending portion 36 relative to the inner cylindrical portion 3 is regulated.

A hydraulic chamber 57 to which a hydraulic fluid for axially moving the piston 21 is supplied is defined by the pressure plate 35, the piston 21, and a part on the outer peripheral surface of the inner cylindrical portion 3 between the pressure plate 35 and the piston 21. The pressure plate 35 configures a wall member defining the hydraulic chamber 57. An oil passage 59 for supplying the hydraulic fluid to the hydraulic chamber 57 is provided in the inner cylindrical portion 3 of the shaft.

A part of the circumferential space S axially on one side relative to the piston 21, namely, a part of the circumferential space S defined by the piston 21, the annular wall portion 7 of the hub 5, the inner peripheral surface of the cylindrical portion 9 of the hub 5 and the part on the outer peripheral surface of the inner cylindrical portion 3 between the piston 21 and the annular wall portion 7, configure a canceller chamber 61 for canceling centrifugal hydraulic pressure of the hydraulic chamber 57. In the canceller chamber 61, a canceller 65 also serving as a retainer of a return spring 63 biasing the piston 21 in a direction for releasing the multiplate wet clutch 1 is disposed.

A cross-section of the canceller 65 is formed into an L shape by a radially extending portion 67 arranged along the annular wall portion 7 of the hub 5 and an axially extending portion 69 extending from an end portion on the outer diameter side of the radially extending portion 67 to axially the other side along the inner periphery surface of the cylindrical portion 9 of the hub 5. The return spring is fixed to the radially extending portion 67. The axially extending portion 69 is arranged between the inner peripheral surface of the cylindrical portion 9 of the hub 5 and the outer peripheral surface of the cylindrical portion 33 of the piston 21, and an end portion axially on the other side of the axially extending portion 69 is fixed to the end portion axially on the other side of the cylindrical portion 9. A seal member 71 is disposed between the axially extending portion 69 of the canceler 65 and the outer peripheral surface of the cylindrical portion 33 of the piston 21. An oil passage 73 for supplying the hydraulic fluid to the canceller chamber 61 is provided in the inner cylindrical portion 3 of the shaft.

As shown in FIG. 1, FIG. 2A and FIG. 2B, an axial groove 75 is formed on the outer peripheral surface in the small diameter portion 49 of the inner cylindrical portion 3 of the shaft. A pair of axial grooves 75 having the similar configuration are formed on the outer peripheral surface of the small diameter portion 49, and the pair of axial grooves 75 are formed to be spaced by 180° from each other with regard to a central axis line of the small diameter portion 49. In addition, in FIG. 1, FIG. 2A and FIG. 2B, only one axial groove 75 is shown. In the present embodiment, a width dimension of the axial groove 75 has a size about 1.5 to 2 times a width dimension of the circumferential groove 53 with which the retaining ring 55 is engaged, but the width dimension of the axial groove 75 is not limited in this range. Depth of the axial groove 75 is formed to be smaller than depth of the circumferential groove 53. The axial groove 75 extends from the end portion axially on the other side of the small diameter portion 49 to axially one side, and the axial groove 75 intersects the circumferential groove 53, and extends to the vicinity of the step portion 47 of the shaft. Accordingly, a part of the axial groove 75 axially on the other side of the circumferential groove 53 is opened to or continuous with the circumferential groove 53, a part of the axial groove 75 axially on one side of the circumferential groove 53 is opened to or continuous with the circumferential groove 53.

The part of the axial groove 75 axially on the other side of the circumferential groove 53 is engaged with other members (not shown), for example, other constituent members of the multiplate wet clutch 1 or constituent members of an automatic transmission in a state where the other members are in contact with a surface 55b axially on the other side of the retaining ring 55. Rotation of the retaining ring 55 is regulated, and simultaneously movement in the axial direction of the retaining ring 55 is regulated by bringing the surface 36b axially on the other side of the first radially extending portion 36 of the pressure plate 35 into contact with the surface 55a axially on one side of the retaining ring 55, and bringing the other members which are engaged with the axial groove 75 as described above into contact with the surface 55b axially on the other side of the retaining ring 55.

In the present embodiment, as shown in FIG. 3, a pair of notched or recessed portions 77 are formed on the surface 36b axially on the other side of the first radially extending portion 36 of the pressure plate 35. The pair of notched portions 77 are opposed with regard to the central axis line of the pressure plate 35. Each notched portion 77 is formed into a groove shape extending in the radial direction. In an end portion on an inner diameter side of each notched portion 77, a protruding portion 79 protruding in an inner diameter direction is formed. A width dimension of the protruding portion 79 in a circumferential direction corresponds to a width dimension of the axial groove 75 formed in the small diameter portion 49. The width dimension of the notched portion 77 in the circumferential direction, namely, the groove width in the groove shape of the notched portion 77 is formed to be larger than the width dimension of the protruding portion 79. More specifically, the width dimension of the notched portion 77 is formed to be larger than the width dimension of the axial groove 75 of the small diameter portion 49.

As shown in FIG. 1 and FIG. 2A, the protruding portion 79 is engaged with the axial groove 75 of the small diameter portion 49 in a state in which the pressure plate 35 is assembled into the small diameter portion 49 of the shaft. The protruding portion 79 is engaged with the axial groove 75. Thus, the pressure plate 35 is fixed to the small diameter portion 49 of the shaft in a state in which rotation is prevented. Moreover, as shown in FIG. 2B, the notched portion 77 of the pressure plate 35 is axially opposed to an opening portion 81 at which the axial groove 75 is opened to or continuous with the circumferential groove 53 through the retaining ring 55 in a state in which the pressure plate 35 is assembled into the small diameter portion 49. In this state, the notched portion 77 is not brought into contact with the surface 55a axially on one side of the retaining ring 55.

Next, operation of the multiplate wet clutch 1 having the above-mentioned configuration will be described.

A state of the multiplate wet clutch 1 shown in FIG. 1 is a state in which engaging of the multiplate wet clutch 1 is released. In this state, the piston 21 is biased to axially on the other side, that is, to a right side in FIG. 1 by the return spring 63 in the canceller chamber 61, namely, to a direction in which the multiplate wet clutch 1 is released. The hydraulic fluid in an amount necessary for generating hydraulic pressure against biasing force of the return spring 63 is not supplied to the hydraulic chamber 57. Accordingly, a friction plate 15 is not frictionally engaged with the separator plate 13, and no driving force is transmitted between the inner cylindrical portion 3 of the shaft and the clutch housing 14.

If the hydraulic fluid is supplied to the hydraulic chamber 57, the hydraulic pressure in the hydraulic chamber 57 increases. If the hydraulic pressure in the hydraulic chamber 57 becomes larger than the biasing force of the return spring 63 to the piston 21, the piston 21 moves to a left hand side in FIG. 1, namely, to a direction in which the multiplate wet clutch 1 is engaged. Then, the end portion on the outer diameter side of the piston 21 is brought into contact with the separator plate 13 arranged most axially on the other side to compress the separator plate 13 toward axially on one side. If the piston 21 further moves, the friction plates 15 and the separator plates 13 alternately arranged to compose of the multiplate clutch portion, are compressed to each other by the piston and frictionally engaged with each other. Thus, the multiplate wet clutch 1 is engaged, and the driving force is transmitted between the inner cylindrical portion 3 of the shaft and the clutch housing 14.

The hydraulic fluid supplied to the hydraulic chamber 57 moves the piston 21 in a direction in which the multiplate wet clutch 1 is engaged, namely, in a direction to axially on one side in the present embodiment, and simultaneously presses the pressure plate 35 in a direction opposite to the axially moving direction of the piston 21, namely, in a direction to axially on the other side. The pressing force causes the pressure plate 35 to press the surface 55a of the retaining ring 55 toward axially on the other side by the surface 36b of the first radially extending portion 36. As a result, the surface 55b of the retaining ring 55 is compressed to a groove surface axially on the other side of the circumferential groove 53. The axial groove 75 of the small diameter portion 49 is opened to the circumferential groove 53, and stress caused by compressing the retaining ring 55 is easily concentrated in a peripheral part of the opening portion 81, namely, in the range shown by the dashed line D1 in FIG. 2B as described in the section of problems to be solved by the invention.

Figure 5A:
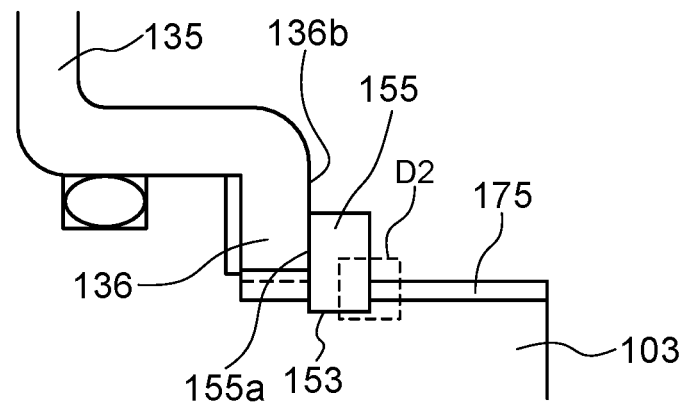
FIG. 5A is an enlarged view of a part surrounded by a circle B in FIG. 4.
Figure 5B:
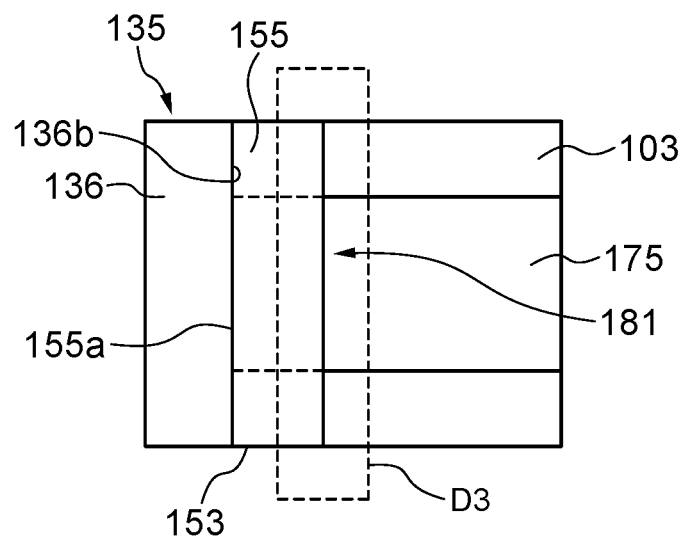
FIG. 5B is a plan view of the part.

In the conventional pressure plate, as shown in FIG. 5B, in the pressure plate 135, a whole of a surface 136b axially on the other side of the first radially extending portion 136 is brought into contact with a surface 155a axially on one side of the retaining ring 155 to press the retaining ring 155 toward axially on the other side by the whole of the surface 136b. Then, a part of the retaining ring 155 facing the opening 181 of the axial groove 175 is to be pressed axially on the other side by force having the same magnitude with the force in other parts of the retaining ring 155. If the part of the retaining ring 155 facing the opening 181 of the axial groove 175 is compressed toward axially on the other side, the part of the retaining ring 155 is slightly distorted in a direction entering from the opening 181 of the axial groove 175 into an inside of the axial groove 175. If the retaining ring 155 is pressed to the groove surface axially on the other side of the circumferential groove 153 in such a state, large force is applied to the edge portion of the opening 181 of the axial groove 175. As a result, the edge portion of the opening 181 of the axial groove 175 is apt to be damaged.

In contrast, according to the present embodiment, the notched or recessed portion 77 is formed in the pressure plate 35, and as shown in FIG. 2B, the notched or recessed portion 77 axially faces the opening 81 of the axial groove 75 of the small diameter portion 49 through the retaining ring 55, and a bottom of the notched or recessed portion 77 is not brought into contact with the surface 55a axially on one side of the retaining ring 55. Further, the width dimension of the notched or recessed portion 77 in the circumferential direction is formed to be larger than the width dimension of the axial groove 75. The pressure plate 35 of the present embodiment has such a configuration, and therefore even if the pressure plate 35 presses the retaining ring 55 in the direction of axially on the other side, the part of the retaining ring 55 facing the opening portion 81 of the axial groove 75 is not directly pressed by the pressure plate 35, and the pressing force applied to the part of the retaining ring 55 becomes smaller than the force in other parts of the retaining ring 55. As a result, stress to the range shown by the dashed line Dl in FIG. 2B, namely, stress to the edge portion of the opening portion 81 of the axial groove 75 is dispersed, and damage on the edge portion of the opening portion 81 of the axial groove 75 can be prevented.

Thus, according to the present embodiment, the notched or recessed portion 77 is provided in the pressure plate 35. Thus, damage of the groove edge portion of the axial groove 75 can be prevented without modifying the shape of the axial groove 75 formed in the inner cylindrical portion 3 of the shaft and further without reinforcing the axial groove 75 by heat treatment. In addition, in the present application, one embodiment is described in which two axial grooves 75 of the inner cylindrical portion 3 and two notched portions 77 of the pressure plate 35 are provided, but the number of the axial grooves 75 and the number of the notches 77 are not limited thereto, and may be appropriately modified. Moreover, in the present embodiment, the piston 21 and the pressure plate 35 are provided in the inner diameter portion 3 of the shaft, but may be provided in the inner cylindrical portion of the clutch housing depending on the shape of the shaft and the clutch housing.

REFERENCE SIGNS LIST

1 multiplate wet clutch
3 inner cylindrical portion of shaft
5 hub
7 annular wall portion
9 inner cylindrical portion
11 spline
13 separator plate
14 clutch housing
15 friction plate
16 spline
19 wet friction material
21 piston
27 inner diameter side U-shaped portion
31 outer diameter side U-shaped portion
33 cylindrical portion
35 pressure plate
36 first radially extending portion
37 first axially extending portion
43 third radially extending portion
47 step portion
49 small diameter portion
53 circumferential groove
55 retaining ring
57 hydraulic chamber
61 canceller chamber
63 return spring
65 canceller
75 axial groove
77 notched or recessed portion
79 protruding portion
81 opening portion

What is claimed is:

1. A multiplate wet clutch, comprising:
a plurality of friction plates provided axially in one of an inner cylindrical member and an outer cylindrical member;
a plurality of separator plates that are provided in the other of the inner cylindrical member and the outer cylindrical member, and are axially alternately arranged with the plurality of the friction plates;
a piston that is movably provided axially on the inner cylindrical member, and if the piston moves in a direction to axially on one side, allows the plurality of the friction plates to engage with the plurality of the separator plates, and if the piston moves in a direction to axially on the other side, releases the engaging;
a wall member provided on the inner cylindrical member to define a hydraulic chamber generating hydraulic pressure for moving the piston;
a retaining ring that is locked in a circumferential groove formed in the inner cylindrical member and is in contact with a part axially on the other side of the wall member to regulate movement of the wall member in the direction to axially on the other side; and
the inner cylindrical member being formed with an axial groove which is opened to the circumferential groove,
wherein, the wall member is formed, in a part axially on the other side, with a recessed portion axially opposed to the axial groove through the retaining ring.

2. The multiplate wet clutch according to claim 1, wherein the wall member is an annular member, and a circumferential width of the recessed portion is larger than a width of the axial groove.

3. The multiplate wet clutch according to claim 2, wherein a plurality of the recessed portions are formed.

4. The multiplate wet clutch according to claim 2, wherein the wall member is an annular member, and the recessed portion has a radially extending groove shape.

5. The multiplate wet clutch according to claim 4, wherein a plurality of the recessed portions are formed.

6. The multiplate wet clutch according to claim 1, wherein the wall member is an annular member, and the recessed portion has a radially extending groove shape.

7. The multiplate wet clutch according to claim 6, wherein a plurality of the recessed portions are formed.

8. The multiplate wet clutch according to claim 1, wherein a plurality of the recessed portions are formed.

* * * * *